(12) United States Patent
Kim et al.

(10) Patent No.: US 11,654,555 B2
(45) Date of Patent: May 23, 2023

(54) ROBOT TEACHING SYSTEM

(71) Applicant: KOREA INSTITUTE OF SCIENCE AND TECHNOLOGY, Seoul (KR)

(72) Inventors: Soonkyum Kim, Seoul (KR); Woosub Lee, Seoul (KR); Alchan Yun, Seoul (KR); Junhyoung Ha, Seoul (KR); Deaho Moon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 198 days.

(21) Appl. No.: 17/102,853

(22) Filed: Nov. 24, 2020

(65) Prior Publication Data
US 2021/0237267 A1 Aug. 5, 2021

(30) Foreign Application Priority Data
Jan. 30, 2020 (KR) ........................ 10-2020-0010961

(51) Int. Cl.
*B25J 9/16* (2006.01)
(52) U.S. Cl.
CPC .................... *B25J 9/163* (2013.01)
(58) Field of Classification Search
CPC ........ B25J 9/163; B25J 9/1656; B25J 9/1694; B25J 9/1602; B25J 9/1664; B25J 13/084; B25J 9/1633; B25J 9/1638; B25J 9/1653; B25J 9/1674; B25J 13/085; B25J 13/087; B25J 13/088; B25J 19/028; B25J 13/086; G05B 19/423; G05B 2219/37274;
(Continued)

(56) References Cited

U.S. PATENT DOCUMENTS

| 9,804,593 B1 | 10/2017 | Davis et al. |
| 9,869,597 B1 * | 1/2018 | Reich .................... G01L 5/1627 |
| 2013/0104672 A1 | 5/2013 | Kim et al. |

(Continued)

FOREIGN PATENT DOCUMENTS

| JP | H06241925 A | 9/1994 |
| JP | 5175691 B2 | 4/2013 |

(Continued)

OTHER PUBLICATIONS

Universal Robots, 2020, https://www.universal-robots.com/products/.

*Primary Examiner* — Abby Y Lin
*Assistant Examiner* — Esvinder Singh
(74) *Attorney, Agent, or Firm* — Rabin & Berdo, P.C.

(57) ABSTRACT

The present disclosure relates to a robot teaching system, which moves a robot according to an external force applied from the outside so that the robot has a location and posture intended for teaching and then teaches a location and posture of the moved robot, and the robot teaching system comprises: an arm including a plurality of articular shafts and a plurality of links connected by the plurality of articular shafts; a plurality of strain gauges respectively coupled to frames of the plurality of links to measure a deformation value of the link that is deformed by the external force; and a calculating device configured to estimate the external force from the deformation value of the link obtained by the plurality of strain gauges, calculate a teaching force from the external force and move the robot by an operation corresponding to the teaching force.

8 Claims, 5 Drawing Sheets

(58) Field of Classification Search
CPC ........... G05B 2219/40599; G05B 2219/41403; A61B 2562/0261
See application file for complete search history.

(56) References Cited

U.S. PATENT DOCUMENTS

| | | | |
|---|---|---|---|
| 2017/0028553 A1* | 2/2017 | Tsuda | B25J 9/0084 |
| 2017/0285625 A1* | 10/2017 | Sato | B25J 9/1633 |
| 2018/0370031 A1* | 12/2018 | Schmitz | B25J 9/1676 |
| 2020/0139229 A1* | 5/2020 | Berme | G01L 5/169 |
| 2020/0171673 A1* | 6/2020 | Moosman | B25J 13/085 |
| 2021/0060793 A1* | 3/2021 | Wang | B25J 9/06 |
| 2021/0190811 A1* | 6/2021 | Crockford | C12N 1/06 |
| 2021/0298734 A1* | 9/2021 | Jaramaz | A61B 90/96 |
| 2022/0088804 A1* | 3/2022 | Spenninger | B25J 9/1638 |

FOREIGN PATENT DOCUMENTS

| | | |
|---|---|---|
| JP | 2017074669 A | 4/2017 |
| KR | 100399679 B1 | 9/2003 |
| KR | 100507118 B1 | 8/2005 |
| KR | 100597558 B1 | 7/2006 |
| KR | 1020100096908 A | 9/2010 |
| KR | 1020130047452 A | 5/2013 |
| KR | 101309652 B1 | 9/2013 |
| KR | 101757881 B1 | 7/2017 |
| KR | 101793139 B1 | 11/2017 |

\* cited by examiner

ROBOT TEACHING SYSTEM

CROSS-REFERENCE TO RELATED APPLICATION

This application claims priority to Korean Patent Application No. 10-2020-0010961, filed on Jan. 30, 2020, and all the benefits accruing therefrom under 35 U.S.C. § 119, the contents of which in its entirety are herein incorporated by reference.

BACKGROUND

1. Field

The present disclosure relates to a robot teaching system, which may directly teach a robot by arranging sensors for detecting an external force of the robot and calculating a teaching force.

[Description about National Research and Development Support]

This study was supported by the Smart factory robot development support project of Ministry of Trade, Industry and Energy, Republic of Korea (Projects No. 1415163911) under Korea Institute of Industrial Technology Evaluation and Management.

2. Description of the Related Art

In order for a robot to perform a specific work, a robot end effector is moved to an appropriate configuration and records the work, and if necessary, the robot teaches the magnitude and direction of an appropriate force required to the work, stores the same and utilize the same in an actual work. The method has been already researched, developed and applied.

In order to estimate an external force applied to the robot, a pressure sensor is attached to a point where the external force is applied to measure the magnitude of the applied external force, or a torque sensor is attached to an individual joint to measure the torque applied to the joint and inverts the torque to estimate the applied external force. Alternatively, for the teaching work, a teaching device including a six-axis torque/force sensor is attached to the end effector, and if a user applies an external force necessary for the work, the external force is measured.

For example, FIG. 6 shows a device 1000 for measuring a teaching force using a 6-axis torque/force sensor 1001. In this system, since there is no moving part between the location where the teaching force is applied and the torque/force sensor, the relative location is constant, and the applied external force may be calculated from a measurement value of the sensor through a simple coordinate conversion operation.

In addition, as shown in FIG. 6, a pressure sensor may be attached to the point where the external force is applied, so that the magnitude of the external force T and the location where the external force T is applied may be directly measured. However, since it is generally difficult to arbitrarily attach the sensor on the surface of a robot having many driving units, only the external force T at the location where the sensor 1001 is attached may be measured. For example, it is impossible to recognize an external force applied to an articular portion to which a robot link or sensor is not attached.

In other words, when teaching a robot, teaching is available only through a specific point (a handle, or the like) of a teaching tool attached for teaching, and the teaching force applied to a link or other points of the robot cannot be estimated.

Therefore, if the posture of the robot arm has a risk of collision with other work pieces at the teaching point and lacks workability, in order to avoid this posture and correct into a new posture, in general, a teaching force must be applied to an arbitrary point of the robot, and for this, an additional teaching method is required.

In order to improve this, a system 2000 for measuring torque applied to individual joints 2001, 2002, 2003, 2004, 2005, 2006 of the articular portion is proposed in FIG. 7. Specifically, the system 2000 depicted in FIG. 7 generally assumes that an external force Ta, Tb is applied to a specific point of the end effector of the robot and estimates the external force. This means that the external force of 6 degrees of freedom in the three-dimensional D space is estimated by measuring a value projected into an articular space of the robot and then projecting the value inversely.

However, if the number of robot joints between the point where the teaching force is applied and the fixed part of the robot is small, if the position where the external force is applied is not an end effector, or if the posture of the robot is close to a singular configuration, it is difficult to estimate the external force, or all the component of the teaching force cannot be estimated. Also, its accuracy is inevitably poor.

In other words, when teaching a robot, the conventional systems require a plurality of additional sensors (a joint torque sensor, a pressure sensor, or the like) or an additional teaching device, for example a six-axis torque/force sensor. In addition, it is impossible to estimate values of the teaching force in all directions for some teaching point.

Therefore, the method for teaching is limited, or the cost increase is required in order to manufacture additional components. In addition, since the user has to perform the teaching work under limited method or sensing range of the robot, intuitive teaching is not possible, and teaching efficiency is low.

SUMMARY

The present disclosure is designed to solve the problems of the prior method described above, and the present disclosure is directed to providing a system for attaching a strain gauge to a robot arm and estimating an external force using the strain gauge without an additional sensor or a teaching jig.

In addition, the present disclosure is directed to providing a system, which may accurately estimate teaching forces applied to several points for more intuitive and quick teaching while minimizing the influence of the posture change of the robot.

Also, the present disclosure is directed to providing a system, which may accurately estimate various external forces while reducing the number of sensors, considering that it is inefficient to attach a plurality of sensors for measuring external forces applied to the robot due to an increase in weight and cost.

In one aspect, there is provided a robot teaching system, which moves a robot according to an external force applied from the outside so that the robot has a location and posture intended for teaching and then teaches a location posture of the moved robot, the robot teaching system comprising: an arm including a plurality of articular shafts and a plurality of links connected by the plurality of articular shafts; a plurality of strain gauges respectively coupled to frames of the plurality of links to measure a deformation value of the link that is deformed by the external force; and a calculating device configured to estimate the external force from the deformation value of the link obtained by the plurality of strain gauges, calculate a teaching force of the external force and move the robot by an operation corresponding to the teaching force.

In addition, the calculating device may calculate the teaching force by converting the deformation value of the link into a moment value of a point where the external force is applied.

In addition, the calculating device may be configured to calculate a torque value applied to the articular shaft from the external force and the moment value.

In addition, when external forces are simultaneously applied to a plurality of points, the calculating device may be configured to separately calculate teaching forces respectively applied to a plurality of arms.

The present disclosure enables intuitive teaching by measuring the deformation of a robot arm link frame with a strain gauge to estimate an external force applied to the robot, and controlling the robot according to the estimated external force.

DETAILED DESCRIPTION

Hereinafter, a strain gauge according to an embodiment of the present disclosure and a robot teaching system using the same will be described through a preferred embodiment of the present disclosure based on the accompanying drawings.

Prior to the description, when a part "includes" a certain component, it means that other components may be further included, rather than excluding other components, unless specifically stated to the contrary.

In addition, even though the embodiments of the present disclosure are described with reference to the accompanying drawings, this is described just for illustrative purposes, and the technical idea of the present disclosure and its configuration and application are not limited thereto.

Figure 1:
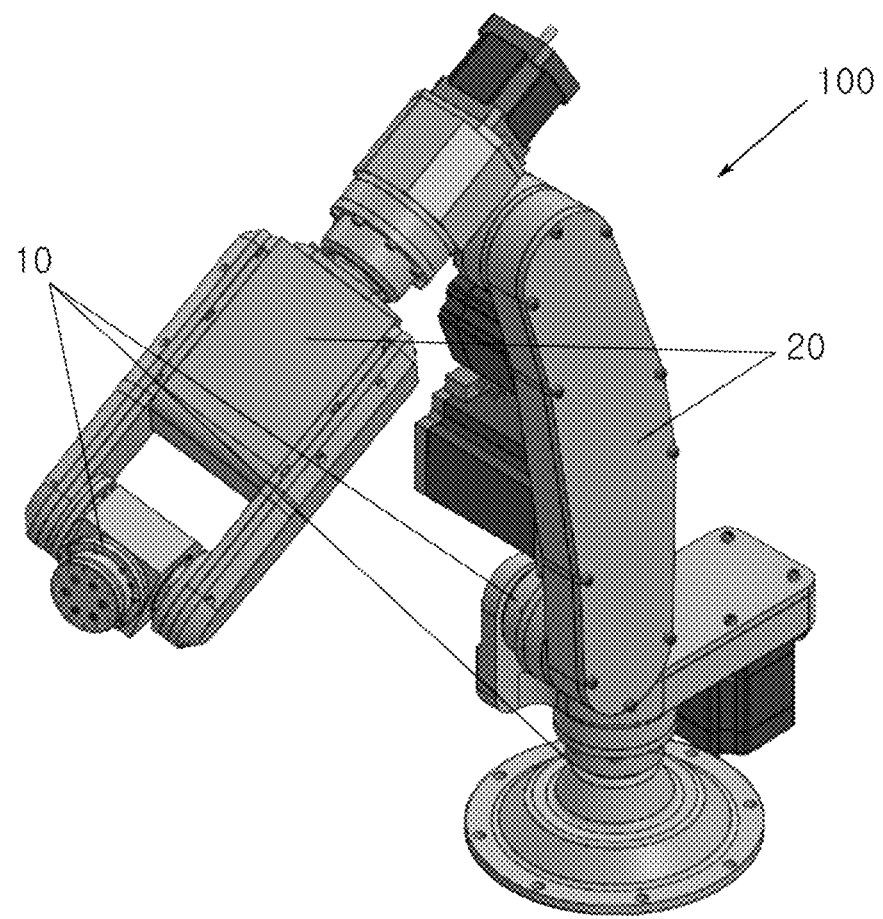
FIG. 1 is a perspective view schematically showing a robot teaching system according to an embodiment of the present disclosure.
Figure 2:
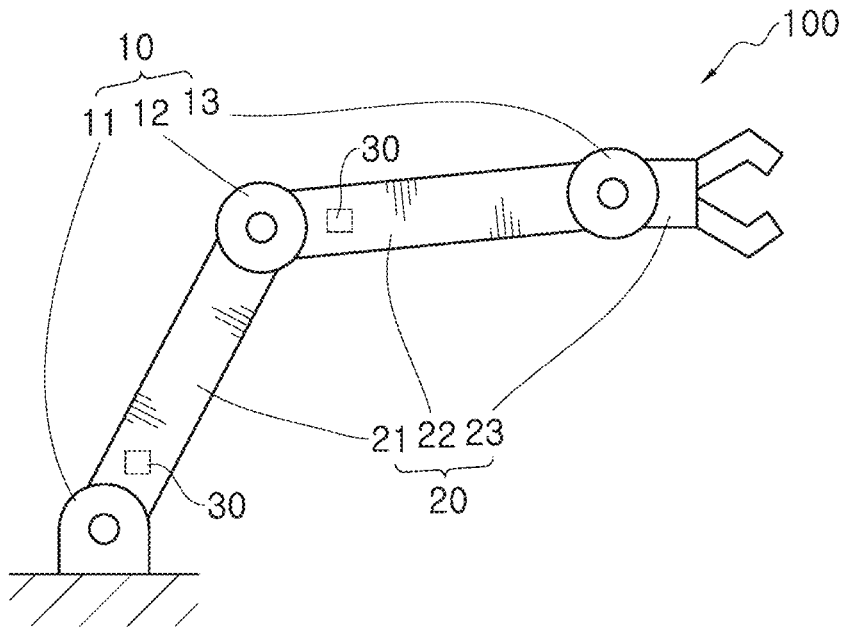
FIG. 2 is a diagram schematically showing an arrangement of a robot teaching system and a sensor according to an embodiment of the present disclosure.

FIG. 1 is a perspective view schematically showing a robot teaching system 100 according to an embodiment of the present disclosure, and FIG. 2 is a diagram schematically showing an arrangement of the robot teaching system 100 and a strain gauge 30 according to an embodiment of the present disclosure.

As shown in FIGS. 1 and 2, the robot teaching system 100 according to an embodiment of the present disclosure attaches a strain gauge 30 to an arm frame 20 of a robot, and the location where the strain gauge 30 is attached may be appropriately obtained by considering the structure of the robot, and the magnitude of an external force to be estimated, a location where a user is comfortable to apply an external force, or the like.

That is, the robot teaching system 100 according to an embodiment of the present disclosure may move the robot according to an external force applied from the outside so that the robot becomes the location and posture that the robot desires to teach, and store the location and posture of the moved robot.

Specifically, the robot teaching system 100 according to an embodiment of the present disclosure comprises an arm including a plurality of articular shafts 10 and a plurality of links 20 connected by the plurality of articular shafts 10, and a plurality of strain gauges 30 respectively coupled to frames of the plurality of links 20 to measure a deformation value of the link that is deformed by the external force.

In addition, a control device connected to the robot by wire or wirelessly may estimate the above external force from the deformation value of the link obtained from the plurality of strain gauges 30 of the robot, calculate a teaching force from the external force, and then move the robot by an operation corresponding to the teaching force.

Specifically, as shown in FIG. 2, if an external force is applied by a user to an end effector or another location of a robot, the robot link frame is minutely deformed, and this deformation is measured using the strain gauge 30.

Figure 3:
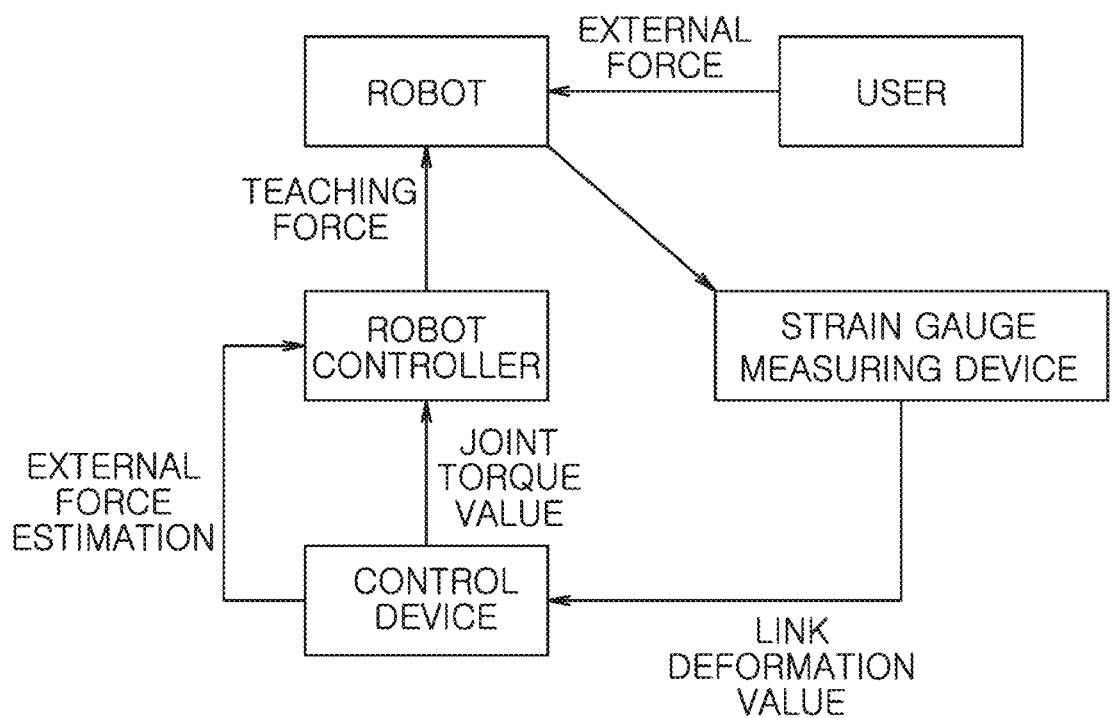
FIG. 3 schematically shows a control flow for controlling a robot according to a teaching force by using the robot teaching system according to an embodiment of the present disclosure.

FIG. 3 schematically shows a control flow for controlling a robot according to a teaching force by using the robot teaching system 100 according to an embodiment of the present disclosure.

Specifically, the deformation value of the link frame measured through the strain gauge 30 may be converted by the calculating device into a moment value of a point where the external force is applied. The relationship between the moment value and the teaching force to be estimated later will be described in more detail below.

In addition, a calculating device included in the control device may estimate a torque value applied to the plurality of articular shafts 10 from the external force and the moment value converted therefrom. Although not shown, it is also possible that a torque gauge is installed to each articular shaft to measure the torque value directly. If the estimated teaching force is transmitted to a robot controller, the controller moves the robot according to the estimated teaching force to conform to an intention of the user.

Figure 4A:
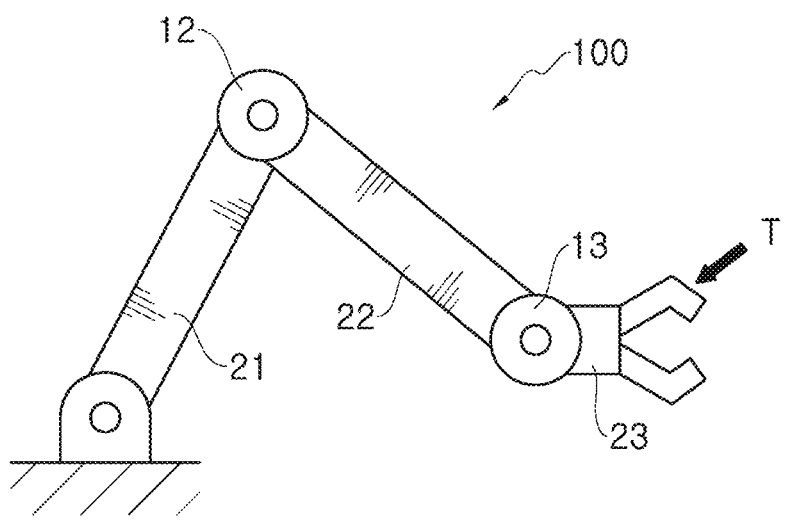
FIG. 4A and FIG. 4B schematically show the relationship between an external force and a moment of a portion where the sensor is attached, in the robot teaching system according to an embodiment of the present disclosure.
Figure 4B:
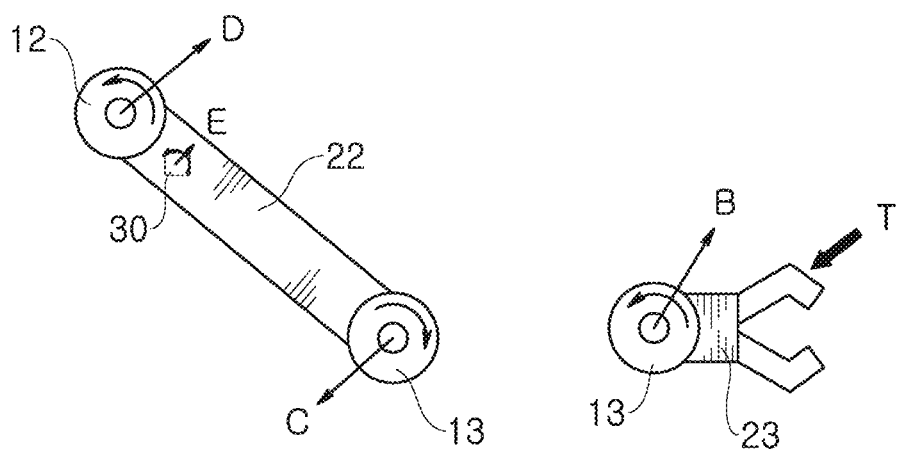

FIG. 4A and FIG. 4B schematically show the relationship between an external force T and a moment of a portion where the strain gauge 30 is attached, in the robot teaching system 100 according to an embodiment of the present disclosure.

As shown in FIG. 4A, the external force T applied to an arbitrary location of the robot may be used to calculate the relationship between the teaching force and the force applied to individual links 22, 23 by means of the static equilibrium or dynamic coupling of each robot arm.

Specifically, as shown in FIG. 4B, B represents the force and moment transmitted by the end effector of the robot to the link 23, and C represents the reaction force applied by the link 23 of the robot to the end effector. In addition, D represents the force and moment applied to the link 22 to which the link 23 of the robot is connected, and E represents the moment applied to the strain gauge attached to the link 22 of the robot.

Therefore, through the external force applied to the link 22 to which the strain gauge 30 is attached, the moment of the point where the strain gauge 30 is attached may be calculated, and if these relation formulas are inverted, the teaching force T may be estimated from the moment of the point where the strain gauge 30 is attached. In addition, although the relation formula between the teaching force and the corresponding moment may vary according to the posture of the robot, the values of the articular shafts 12, 13 of the robot may be calculated by receiving from the calculating device (not shown).

Figure 5:
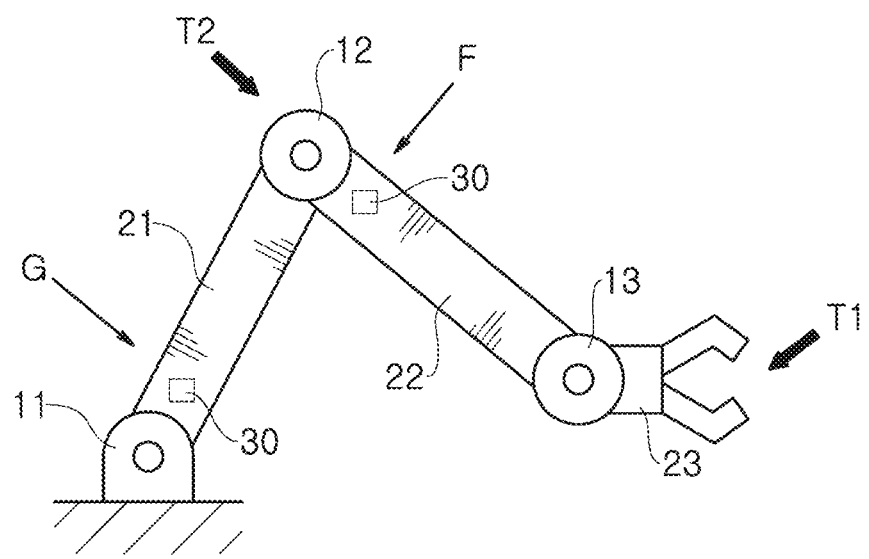
FIG. 5 schematically shows a case where external forces are simultaneously applied to two points of the robot, in the robot teaching system according to an embodiment of the present disclosure.
Figure 6:
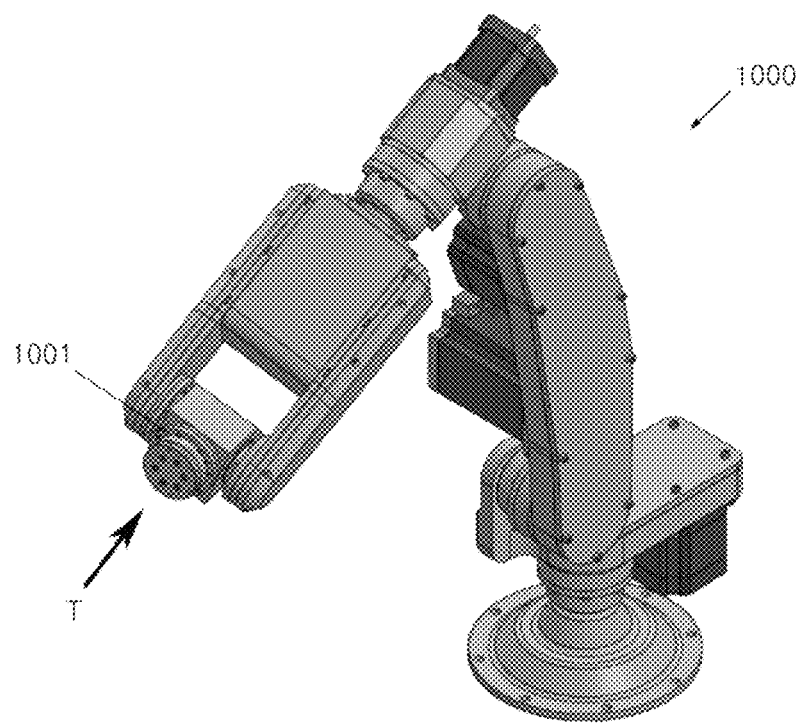
FIG. 6 shows an example of a conventional robot teaching system.
Figure 7:
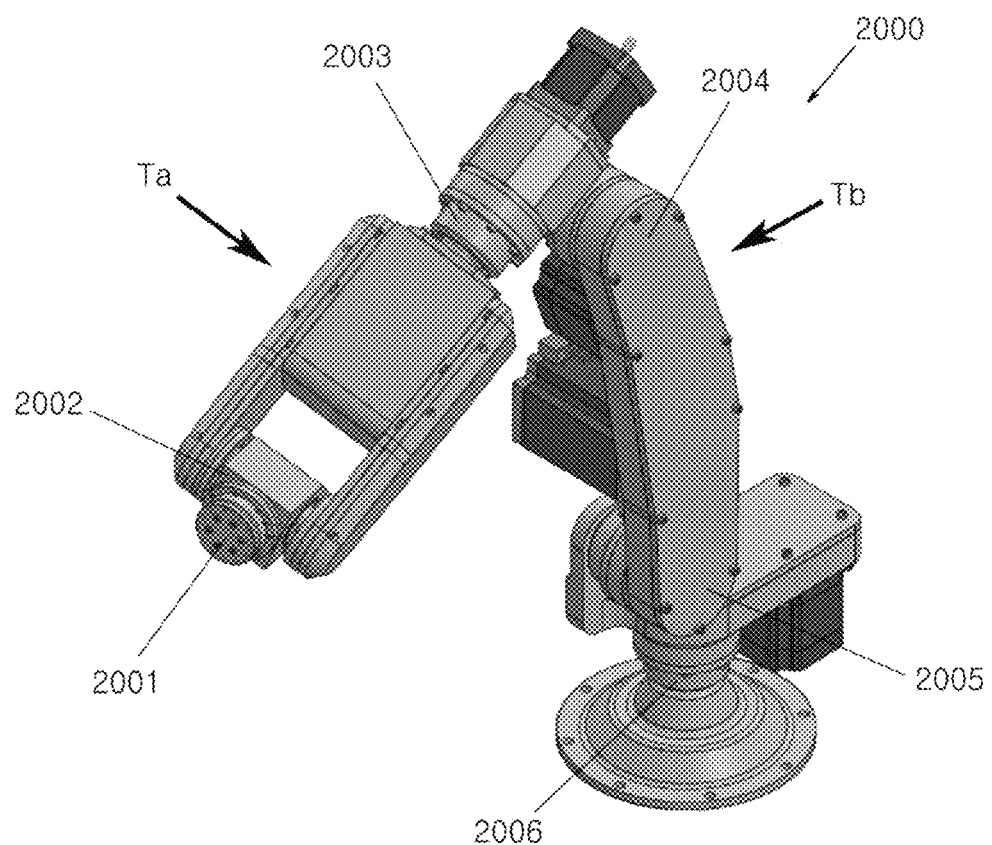
FIG. 7 shows an example of another conventional robot teaching system.

FIG. 5 schematically shows a case where external forces are simultaneously applied to two points of the robot, in the robot teaching system 100 according to an embodiment of the present disclosure.

As shown in FIG. 5, the calculating device of the robot teaching system 100 of the present disclosure may separately acquire the teaching forces respectively applied to the plurality of links, when external forces T1, T2 are simultaneously applied to a plurality of points.

Specifically, T1 represents the external force applied to the end effector of the robot, and T2 represents the external force applied to the articular shaft of the robot. In addition, F represents the moment applied to the strain gauge attached to the link 22, and G represents the moment applied to the strain gauge attached to the link 21.

That is, when the external forces T1, T2 are simultaneously applied to corresponding locations, the moment F applied to the link 22 is only affected by the external force of T1, and the moment G applied to the link 21 is represented as the sum of the applied external forces T1 and T2. Therefore, it is possible to separately estimate the teaching forces applied to T1 and T2, which may allow more intuitive and diverse teaching.

With reference to the above description, it will be understood by those skilled in the art that the present disclosure can be implemented in other concrete forms without changing the technical idea or essential features.

Therefore, it should be understood that the embodiments described above are illustrative in all respects, and are not intended to limit the present disclosure to the embodiments, and the scope of the present disclosure is not limited to the detailed description as above, but is defined by the appended claims. Also, all changes or modifications derived from the meaning and scope of the claims and equivalent concepts should be construed as being included in the scope of the present disclosure.

REFERENCE SIGNS 100 robot teaching system
10 plurality of articular shafts
11, 12, 13 articular shaft
20 plurality of links
21, 22, 23 link
30 strain gauge

What is claimed is:

1. A robot teaching system, which moves a robot according to an external force applied from outside so that the robot has a location and posture intended for teaching and then teaches the location and posture of the moved robot, the robot teaching system comprising:
   an arm including a plurality of articular shafts and a plurality of links connected by the plurality of articular shafts;
   a plurality of strain gauges respectively coupled to frames of the plurality of links to measure a deformation value of a link that is deformed by the external force; and
   a calculating device configured to estimate the external force from the deformation value of the link obtained by the plurality of strain gauges, calculate a teaching force from the external force and move the robot by an operation corresponding to the teaching force;
   wherein when external forces are simultaneously applied to a plurality of points, the calculating device is configured to separately calculate teaching forces respectively applied to the plurality of the links, and to calculate a moment of a first link of the plurality of links by summing a first one of the external forces and a second one of the external forces; and
   wherein calculating the teaching force includes calculating a moment of a point at which at least one strain gauge of the plurality of strain gauges is attached, based on
   (i) a force and moment transmitted, due to the external force, by an end effector of the arm to a link of the plurality of links coupled to the end effector,
   (ii) a reaction force applied by the link coupled to the end effector, and
   (iii) a force and moment applied to a second link of the plurality of links, the second link being coupled to the link coupled to the end effector, and the at least one strain gauge being attached to the second link,
   inverting a relation formula based on (i), (ii) and (iii), the relation formula relating the teaching force to a corresponding moment, and
   estimating the teaching force from the moment of the point at which the at least one strain gauge of the plurality of strain gauges is attached based on the inverted relation formula.

2. The robot teaching system according to claim 1, wherein the calculating device calculates the teaching force by converting the deformation value of the link into a moment value of a point where the external force is applied.

3. The robot teaching system according to claim 2, wherein the calculating device is configured to calculate a torque value applied to an articular shaft from the external force and the moment value.

4. The robot teaching system according to claim 1, wherein the first link is connected to a base of the robot arm.

5. The robot teaching system according to claim 4, wherein the moment of the second link of the plurality of links is only affected by the first one of the external forces.

6. The robot teaching system according to claim 5, wherein the first one of the external forces is applied to a first articular shaft at a first end of the second link.

7. The robot teaching system according to claim 6, wherein the second one of the external forces is applied to a second articular shaft at a second end of the second link.

8. The robot teaching system according to claim 6, wherein the first articular shaft is connected to the end effector.

* * * * *